UNITED STATES PATENT OFFICE.

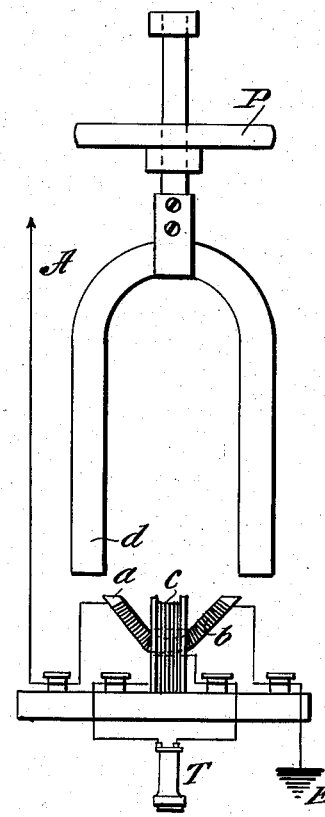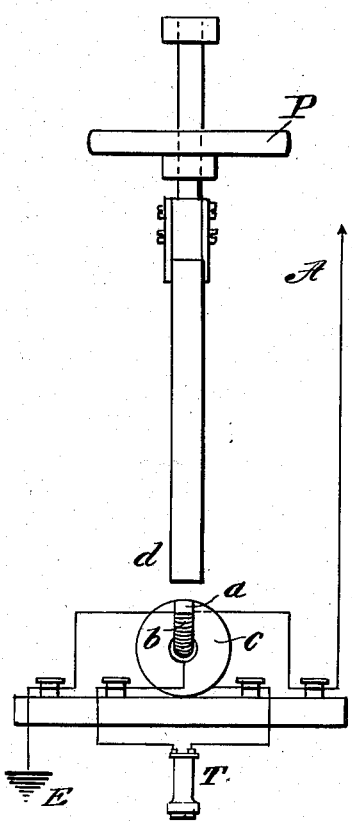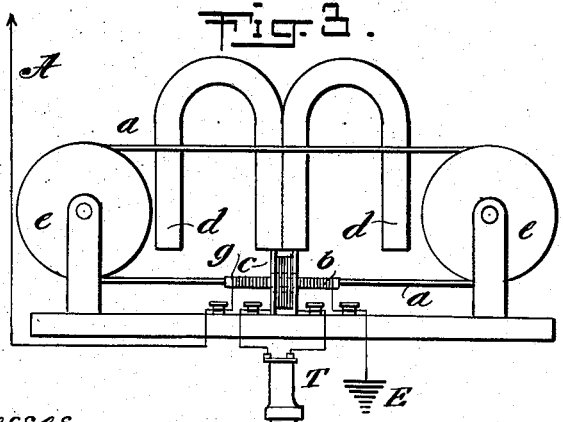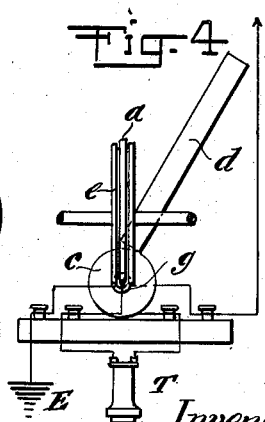

GUGLIELMO MARCONI, OF LONDON, ENGLAND, ASSIGNOR TO MARCONI WIRELESS TELEGRAPH COMPANY OF AMERICA, A CORPORATION OF NEW JERSEY.

DETECTING ELECTRICAL OSCILLATIONS.

No. 884,988.      Specification of Letters Patent.      Patented April 14, 1908.

Original application filed November 28, 1902, Serial No. 132,974. Divided and this application filed February 2, 1903. Serial No. 141,399.

*To all whom it may concern:*

Be it known that I, GUGLIELMO MARCONI, a subject of the King of Italy, and a resident of London, England, (having a post-office address at 18 Finch lane, London, England,) have invented certain new and useful Improvements in Detecting Electrical Oscillations, of which the following is a full and true description, reference being had to the accompanying drawings, showing apparatus which may be employed by an operator in availing himself of my present improvements.

The object of this invention is to detect electrical oscillations, such as Hertzian waves propagated at a distant point, such detection being accomplished without the necessity of employing special wave-responding devices, now interchangeably designated "coherers," "decoherers," "anti-coherers," "imperfect contacts," etc.

In the carrying out of my present improvements, I avail myself of the discovery made by me, that if, at a receiving-station, a magnetic coil be maintained in a field created independently of received oscillations, and a receiving-instrument be connected with said field, the received oscillations may be utilized to vary the current of the circuit of the receiving-instrument, so as to render the received signal intelligible.

My present theory of the method hereinafter described is as follows, although I intend to claim this method broadly, whether this theory is correct or not:—It is a well known fact that after any change has taken place in the magnetic force acting on a piece of iron, some time elapses before the corresponding change in the magnetic state of the iron is completed. If the applied magnetic force be either subjected to a gradual increase followed by an equally gradual diminution or caused to effect a cyclic variation, the corresponding induced magnetic variation in the iron will lag behind the changes in the applied force. To this tendency to lag behind, Prof. Ewing has given the name magnetic hysteresis. It has been shown also by Gerosa, Finzi, and others that the effect of alternating currents or high frequency electrical oscillations acting upon iron is to reduce considerably the effects of magnetic hysteresis, causing the metal to respond much more readily to any influence which tends to alter its magnetic condition. The effect of electrical oscillations probably is to bring about a momentary release of the molecules of iron from the constraint (or viscosity) in which they are ordinarily held, diminishing their retentiveness and consequently decreasing the lag in the magnetic variation taking place in the iron. I, therefore, anticipated that the group of electric waves emitted by each spark of a Hertzian radiator would, if caused to act upon a piece of iron which is being subjected at the same time to the slowly varying magnetic force, produce sudden variations in its magnetic hysteresis, which variations would produce others of a sudden or jerky nature in its magnetic condition. In other words, the magnetization of the iron, instead of slowly following the variations of the magnetic force applied, would at each spark of the transmitter suddenly diminish its magnetic lag caused by hysteresis. These jerks in the magnetic condition of the iron would cause induced currents in a coil of wire of strength sufficient to allow the signals transmitted to be detected intelligibly on a telephone, or perhaps even read on a galvanometer. The jerks in the magnetic condition of the iron might also be detected by a telephone diaphragm applied directly thereto.

The drawings show two forms of apparatus, invented by me and constituting the subject-matter of an application, Serial No. 132,974, filed by me November 28, 1902, for Letters Patent of the United States, which may be employed in the detection of electrical oscillations in accordance with my present invention, although my present invention is not limited to the use of the apparatus disclosed in that specification.

Figure 1 is a front view of an apparatus having a core and an adjacent magnet, which may be stationary, or either one or both of which may be movable; Fig. 2 is an end view of said apparatus; Fig. 3 is a front view of an apparatus having a movable core, and an adjacent magnet which may be either stationary or movable; and Fig. 4 is an end view of the apparatus of Fig. 3.

Each form of apparatus embodies an aerial A, connected to one end of a coil $b$, the other end of said coil being connected to earth, E. The coil $b$, in Figs. 1 and 2, is wound about the bent stationary core $a$, while, in Figs. 3 and 4, said coil is wound about an insulating tube $g$, through which an endless wire band, $a$, constituting the core is moved by means of the pulleys $e\ e$. In Figs. 1 and 2, the magnet $d$ is suspended above the core $a$, so as to create a magnetic field therethrough, and if this magnet is rotated above the core, by the pulley P, there will be a variation of the strength or potential of said magnetic field, due to the increase and decrease of distance between the pole-ends and core-ends, and also a reversal of the direction of the field, due to the alternate reversal of the position of the pole-ends with respect to the core.

In the structure shown in Figs. 3 and 4, the magnet $d$, is shown as composed of a pair of permanent magnets, and is disposed adjacent to the coil $b$, and has its extreme pole-ends located at either end of the insulating tube, $g$, and a magnetic field which includes said magnets $d$, and the portion of the wire within said tube, is thus created. It is obvious that instead of permanent magnets, an electro-magnet might be employed. With either form of magnet, if the wire is moved through the tube the position of the field in the core will be constantly changed, thereby increasing and diminishing the strength or potential of the field, in that part of the iron wire which is approaching and departing from the poles of the magnets. The magnet $d$, whether a permanent or electrical magnet, may be disposed stationary with respect to the coil $b$, or may be movable with relation thereto.

By these methods, the core $a$, which may not be sensibly affected by electrical oscillations, or Hertzian waves, under ordinary circumstances, becomes sensitive to such oscillations when placed in the magnetic-field, and, in such event, oscillations received by the aerial A and the coil connected therewith, cause rapid changes in the magnetization of the core, or otherwise affect the receiving circuit. These rapid changes, in the forms of apparatus illustrated, produce induced currents in another coil, $c$, included in circuit with a telephone, T, or other instrument, wherein the induced currents are rendered intelligible as definite signals.

My new method may be carried out by other forms of apparatus than those described and shown, and I do not, therefore, wish to be understood as limiting my invention thereto.

I claim:

1. The method of detecting electrical oscillations which consists in receiving said oscillations by means of a coil maintained in a magnetic field, which field is created independently of received oscillations and of the apparatus which renders received oscillations intelligible, substantially as described.

2. The method of detecting electrical oscillations which consists in receiving said oscillations by means of a coil maintained in a magnetic field, which field is continually varied independently of the oscillations, substantially as described.

3. The method of detecting electrical oscillations which consists in receiving said oscillations by means of a coil maintained in a magnetic field, which field is periodically reversed, substantially as described.

4. The method of detecting electrical oscillations which consists in receiving said oscillations by means of a coil maintained in a magnetic field, which field is continually varied during the receipt of the oscillations, substantially as described.

5. The method of detecting electrical oscillations which consists in creating a magnetic field at a receiving station independently of received oscillations, inductively connecting with said field an instrument adapted to render the received oscillations intelligible, and utilizing the received oscillations to vary the current of the circuit of said instrument, substantially as described.

6. The method of detecting electrical oscillations which consists in varying a magnetic field at a receiving-station independently of received oscillations, inductively connecting with said field an instrument adapted to render the received oscillations intelligible, and utilizing the received oscillations to independently vary the current of the circuit of said instrument, substantially as described.

7. The method of detecting electrical oscillations which consists in periodically reversing a magnetic field at a receiving-station, inductively connecting with said field an instrument adapted to render the received oscillations intelligible, and utilizing the received oscillations to independently vary the current of the circuit of said instrument, substantially as described.

8. The method of detecting electrical oscillations, which consists in creating, at a receiving-station, a varying or moving magnetic field, connecting therewith a device for rendering received signals manifest, and causing received oscillations to alter the magnetization of said field, whereby the device aforesaid, affected by the changes of magnetization, is made operative, substantially as described.

9. The method of detecting electrical oscillations, which consists in creating, at a receiving-station, a varying or moving magnetic field, causing received electrical oscillations to alter the magnetization of said field, and employing such changes to render operative a signal-receiving mechanism, substantially as described.

10. As an improvement in the art of signaling by electro-magnetic waves, the method herein described, which consists in changing by electro-magnetic waves the amount of magnetization in a magnetic material subjected to a varying magnetizing force, substantially as set forth.

11. As an improvement in the art of signaling by electro-magnetic waves, the method herein described, which consists in maintaining a magnetic material in a varying magnetic state and changing the amount of magnetization by electro-magnetic waves, substantially as set forth.

12. The method of detecting electrical oscillations, which consists in receiving said oscillations by means of a wave-responsive device comprising a coil located in a constantly-maintained magnetic field, which field is created independently of the receipt of the oscillations, substantially as described.

13. The method of detecting electrical oscillations, which consists in receiving said oscillations by means of a wave-responsive device comprising a coil located in a constantly-varying magnetic field, substantially as described.

14. The method of detecting electrical oscillations, which consists in receiving said oscillations by means of a coil maintained in a magnetic field, which field is varied independently of the oscillations, substantially as described.

15. The method of detecting electrical oscillations, which consists in receiving said oscillations by means of a coil maintained in a magnetic field, which field is varied during the receipt of oscillations and independently thereof, substantially as described.

16. In a wireless telegraph system, the method of detecting electrical oscillations of high frequency, which consists in creating a magnetic field at a receiving station, varying the said field by the movement of a body therein, modifying the said field by the received oscillations and utilizing the modification in the field to create intelligible signals, substantially as described.

17. In a wireless telegraph system, the method of detecting electrical oscillations of high frequency, which consists in creating at a receiving station a magnetic field through a circuit composed of elements of different permeability, varying said field by the relative movement of said elements, modifying said field by the received oscillations and utilizing the modification in said field to create intelligible signals, substantially as described.

18. The method of detecting electrical oscillations which consists in subjecting to the effect of such oscillations a magnetic body which is also subjected at the same time to a rising and falling magnetic excitation.

In witness whereof, I have hereunto signed my name, this 27th day of January, 1903.

GUGLIELMO MARCONI.

In presence of—
WILLIAM H. BERRIGAN,
JAMES J. COSGROVE.